Figure 1:
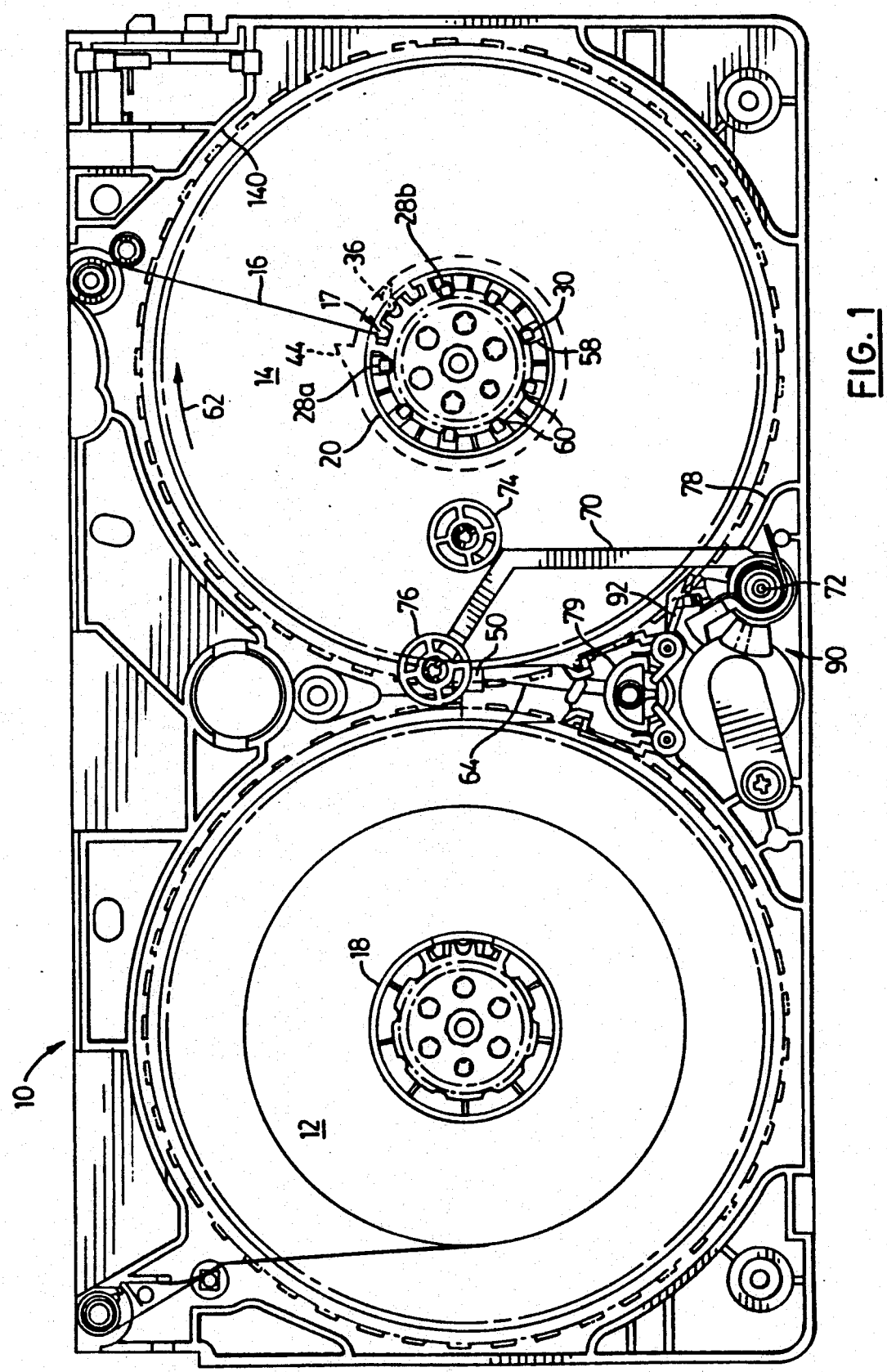

United States Patent [19]

Granzotto

[11] Patent Number: 5,228,637
[45] Date of Patent: Jul. 20, 1993

[54] CASSETTE REEL LOCK CONTROL APPARATUS

[75] Inventor: Robert Granzotto, Toronto, Canada

[73] Assignees: Arena Recreations (Toronto) Limited; William L. Heisey, both of Toronto, Canada

[21] Appl. No.: 817,279

[22] Filed: Jan. 3, 1992

Related U.S. Application Data

[63] Continuation-in-part of Ser. No. 560,047, Jul. 30, 1990, abandoned.

[51] Int. Cl.⁵ .............................................. G11B 23/087
[52] U.S. Cl. ...................................... 242/199; 360/132
[58] Field of Search ............................... 242/197–200; 360/132

[56] References Cited

FOREIGN PATENT DOCUMENTS 0339916 11/1989 European Pat. Off. .
84/01657 4/1984 PCT Int'l Appl. .
2234225 1/1991 United Kingdom .

Primary Examiner—Daniel P. Stodola
Assistant Examiner—John Q. Nguyen

[57] ABSTRACT

A tape cassette allows a complete play through of the tape only once. The cassette comprises a follower arm indicative of the amount of tape on the take-up reel. When a pre-determined amount of tape is wound onto the take-up reel, a lock actuation means is enabled such that when the tape is thereafter rewound a locking arm is displaced into the path of a tooth carried by a locking member on the take-up reel when a pre-determined amount of tape has been wound onto the supply reel. Thereafter, forward feeding of the tape is inhibited because the locking member locks to the remainder of the take-up reel by virtue of a pawl carried by the take-up reel which is urged into a notch in the locking member.

31 Claims, 15 Drawing Sheets

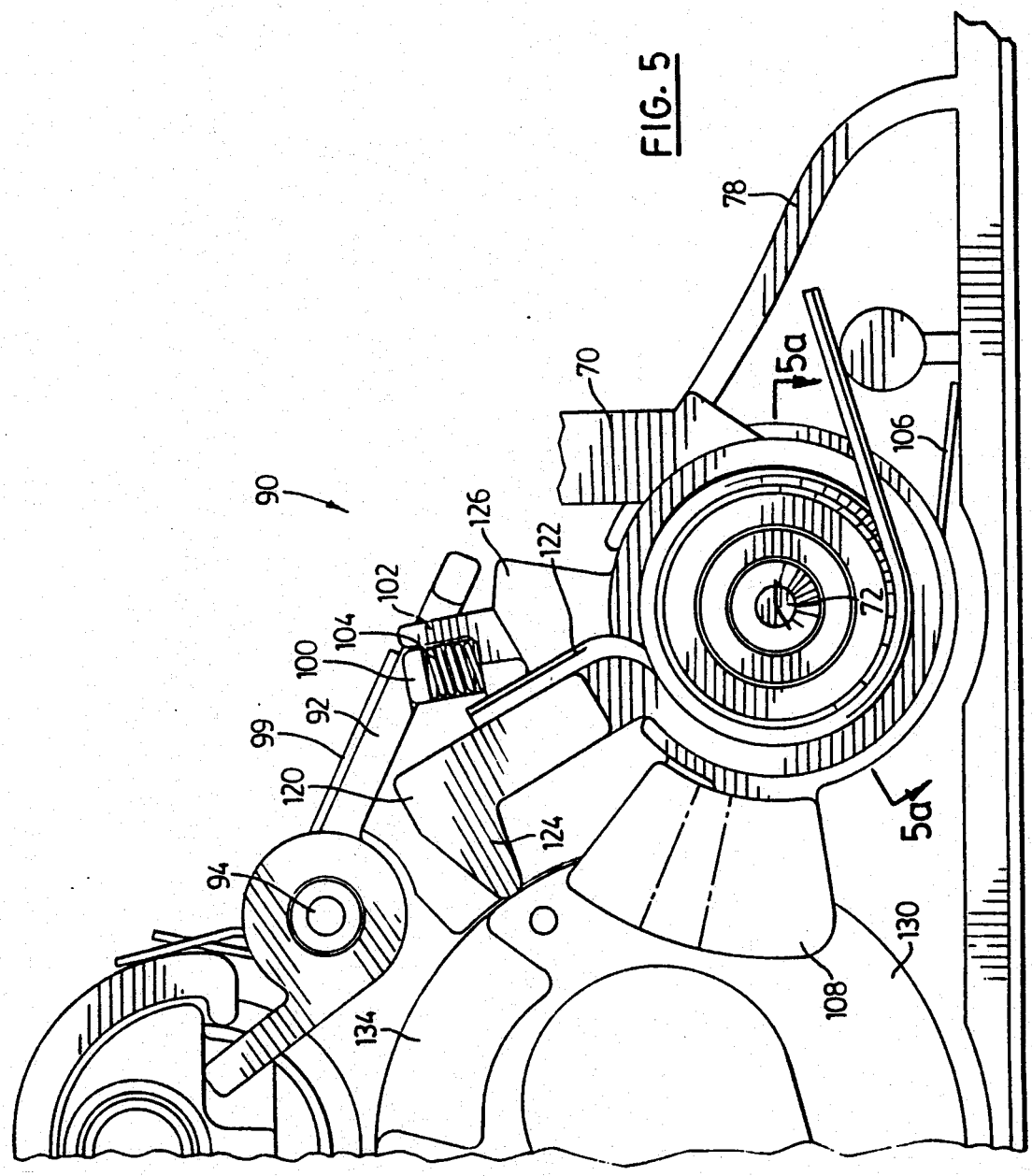

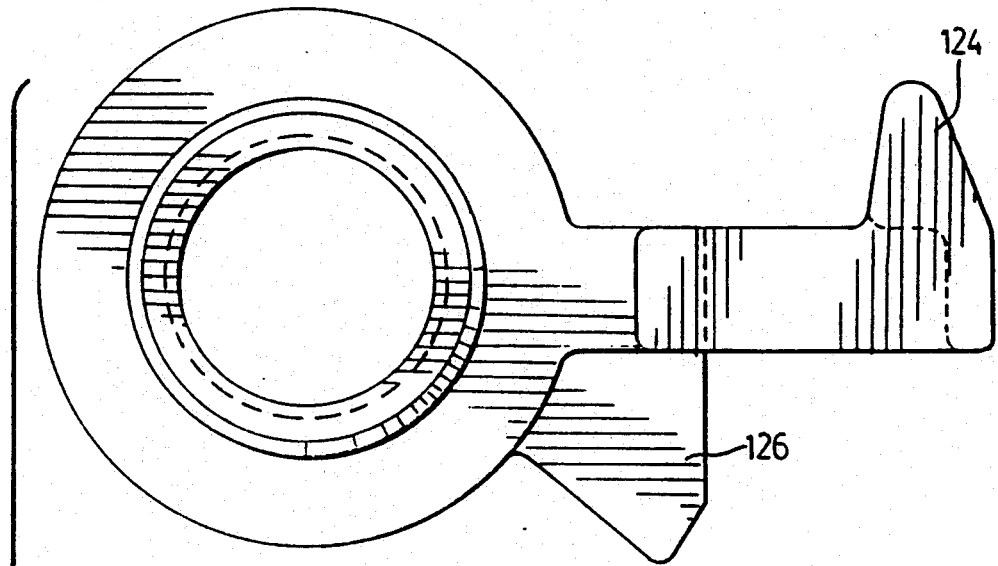
FIG. 9
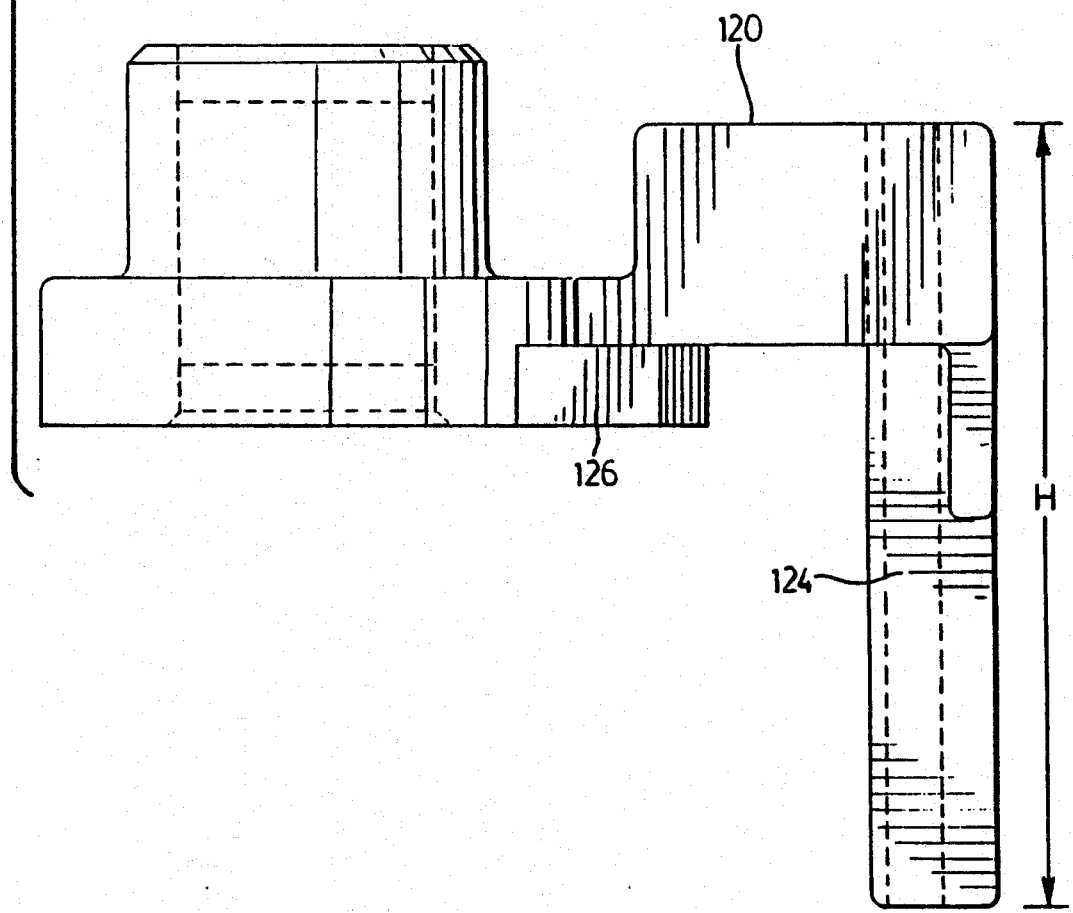

CASSETTE REEL LOCK CONTROL APPARATUS

This application is a continuation-in-part of U.S. patent application Ser. No. 07/560,047 filed Jul. 30, 1990, now abandoned.

This invention relates to a means to control the locking of a cassette reel against rotation in a forward feed direction.

U.S. Pat. No. 4,632,335 to Dickson et al. issued Dec. 30, 1986 discloses a tape cassette having a locking mechanism which allows the tape to be played in a forward feed direction but which locks the tape against rewinding unless unlocking pins of appropriate length are inserted into the locking mechanism. Such a cassette, when recorded with a video taped movie, allows for the rental of the cassette on a single play basis since only the rental outlet will have at its disposal a means to unlock the cassette to allow rewinding. However, the cassette suffers the drawback that the renter is unable to replay any segments of the rented movie. Further, the movie must be returned to the rental outlet without being rewound, which increases the overhead before the cassette may be rented again.

The subject invention seeks to overcome drawbacks of known cassette locking mechanisms. According to the present invention there is provided a tape cassette comprising: a supply reel; a take-up reel; forward feed lock means for, upon being actuated, immediately limiting rotation of at least one of said supply reel and said take-up reel to no more than a certain number of revolutions in a forward feed direction when more than said certain number of revolutions of said at least one reel are available in said forward feed direction while not affecting rotation of said supply reel and said take-up reel in a reverse feed direction and without contacting the tape of the tape cassette, said forward feed lock means including a member mounted for relative rotation about the axis of one of said supply reel and said take-up reel and locking means which, during forward feeding of said cassette, whenever said member is inhibited from rotation in a forward feed direction, locks said member to said member mounting reel after permitting at least a fraction of a revolution of relative rotation between said member and said member mounting reel; indicator means for indicating the amount of tape on at least one of said supply reel and said take-up reel; forward feed lock actuation means for, if disabled, then being enabled by said indicator means during forward feeding whenever said indicator means indicates a first pre-selected amount of tape on one of said supply reel and said take-up reel, said forward feed lock actuation means, whenever enabled, responding to said indicator means during rewinding of said tape for actuating said forward feed lock means when said indicator means indicates a second pre-selected amount of tape on one of said supply reel and said take-up reel whereby forward feeding of said tape is thereafter limited while reverse feeding of said tape is unaffected; and reset means selectively operable to disabled said forward feed lock actuation means at least when said forward feed lock actuation means has actuated said forward feed lock means whereby said forward feed lock actuation means, when disabled, remains disabled until enabled by said indicator means.

Figure 3:
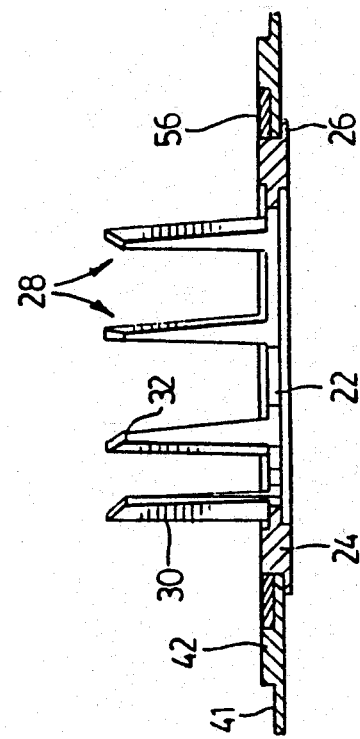
Figure 2A:
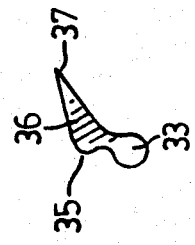
Figure 2:
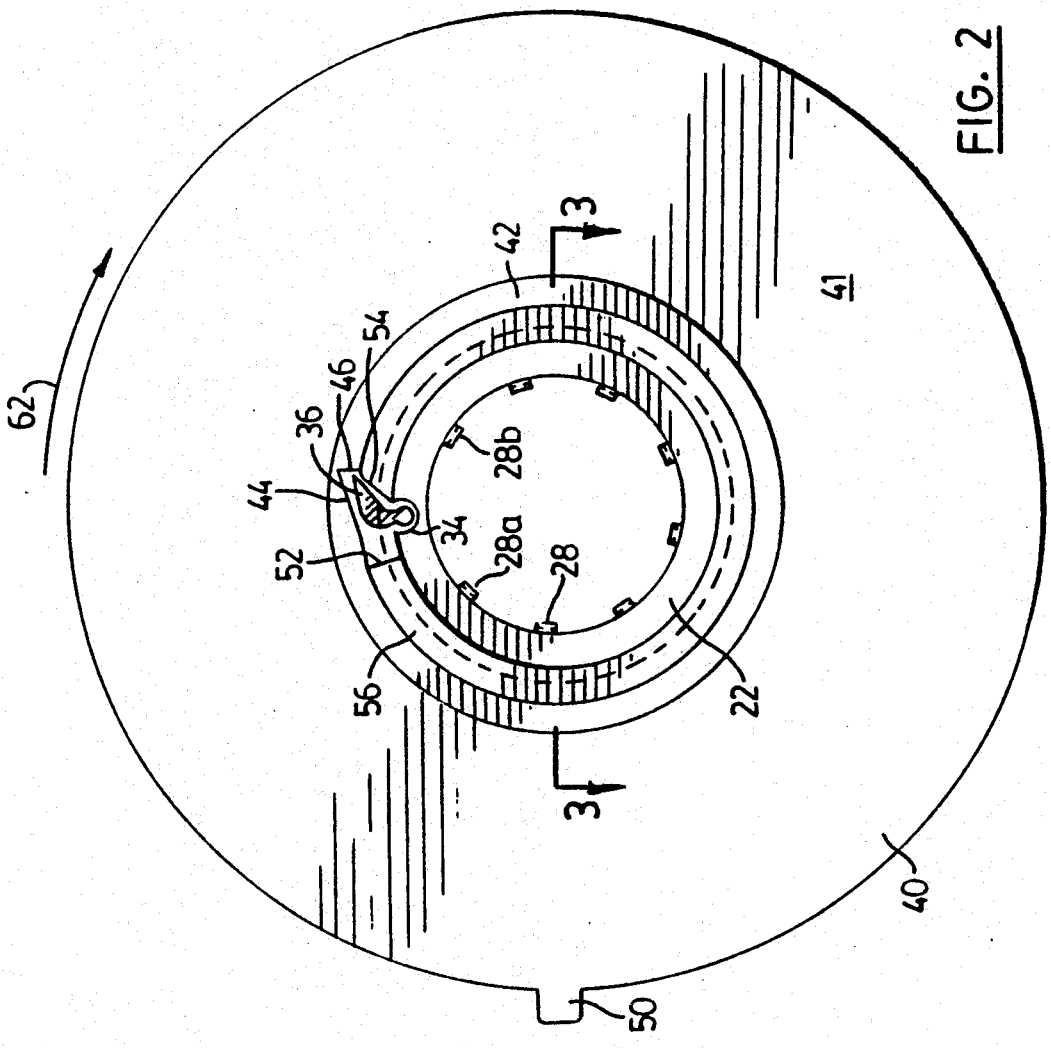
Figure 4:
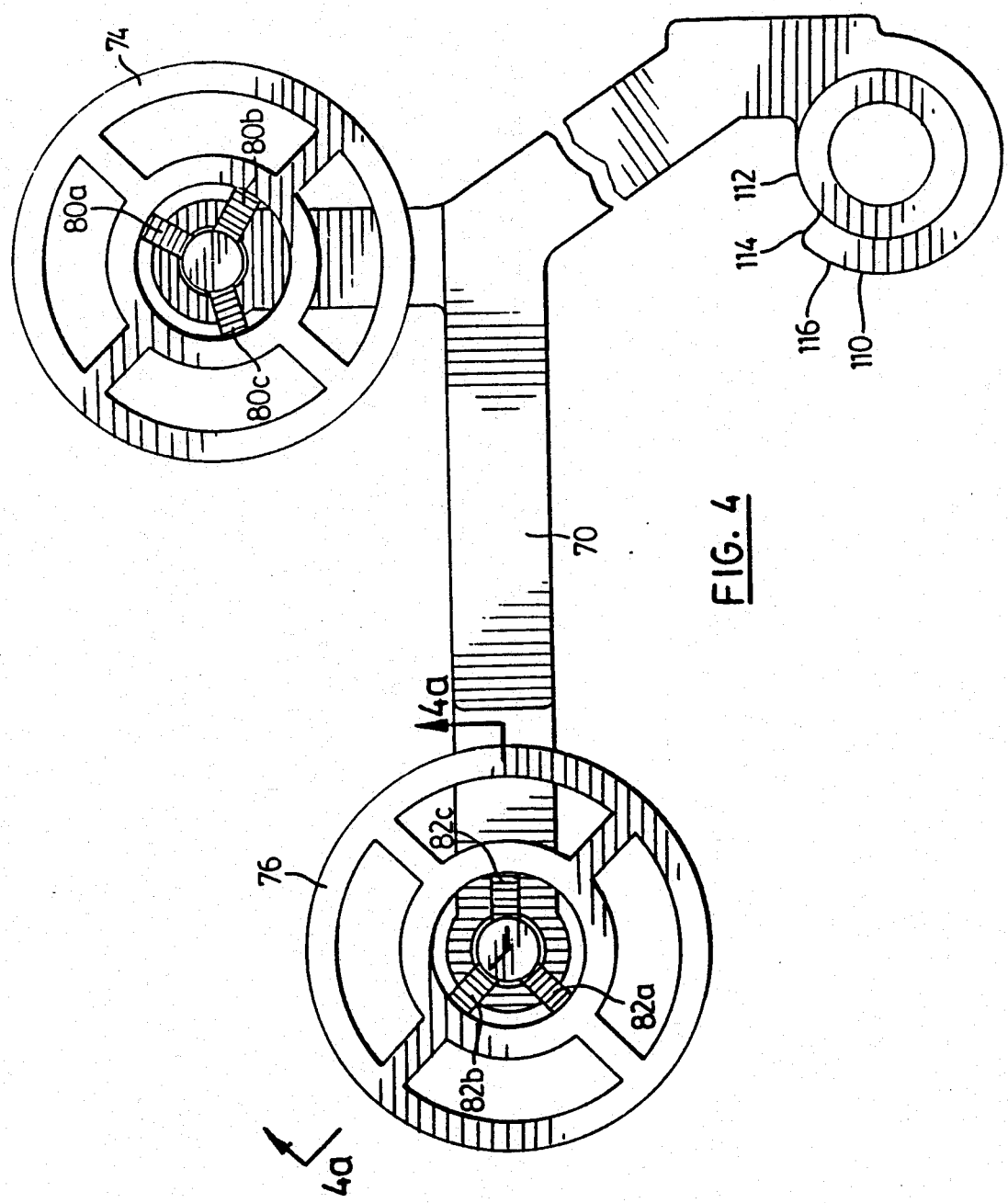
Figure 4A:
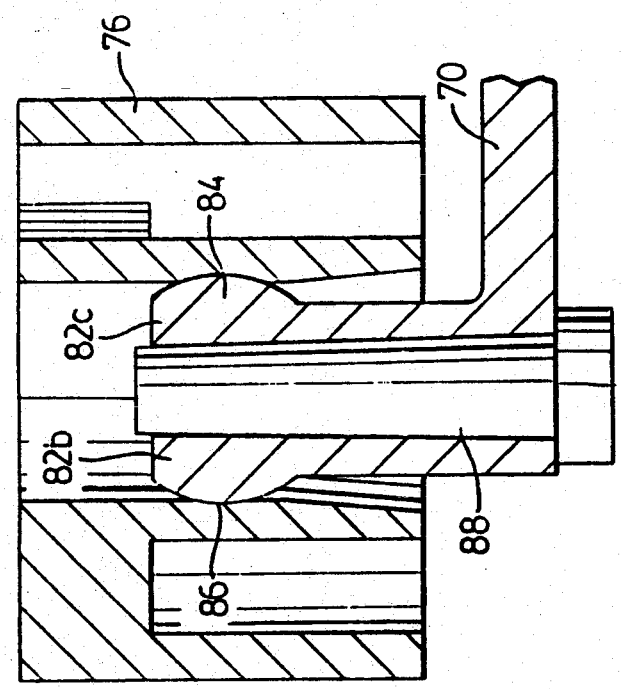
Figure 5A:
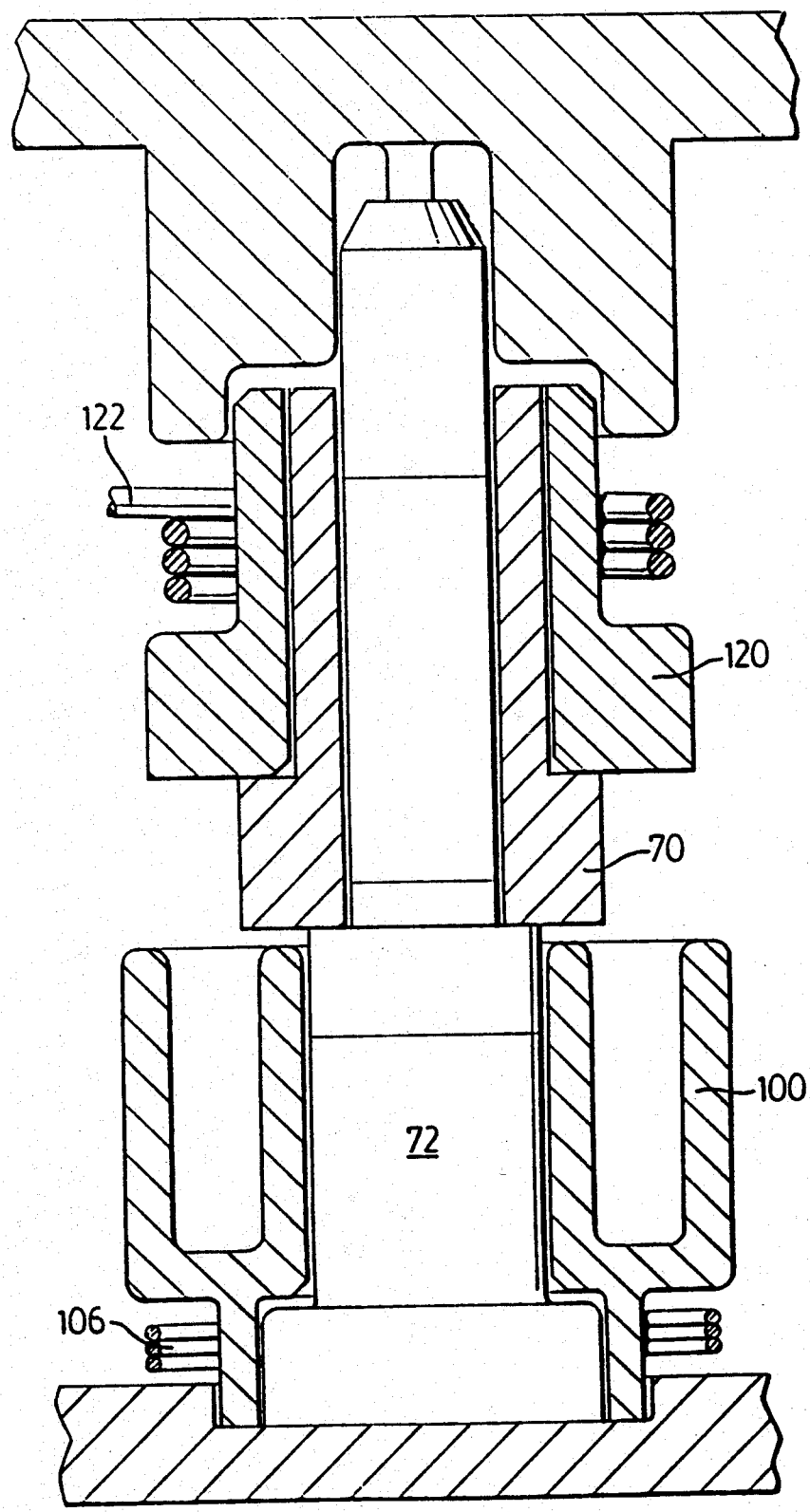
Figure 6:
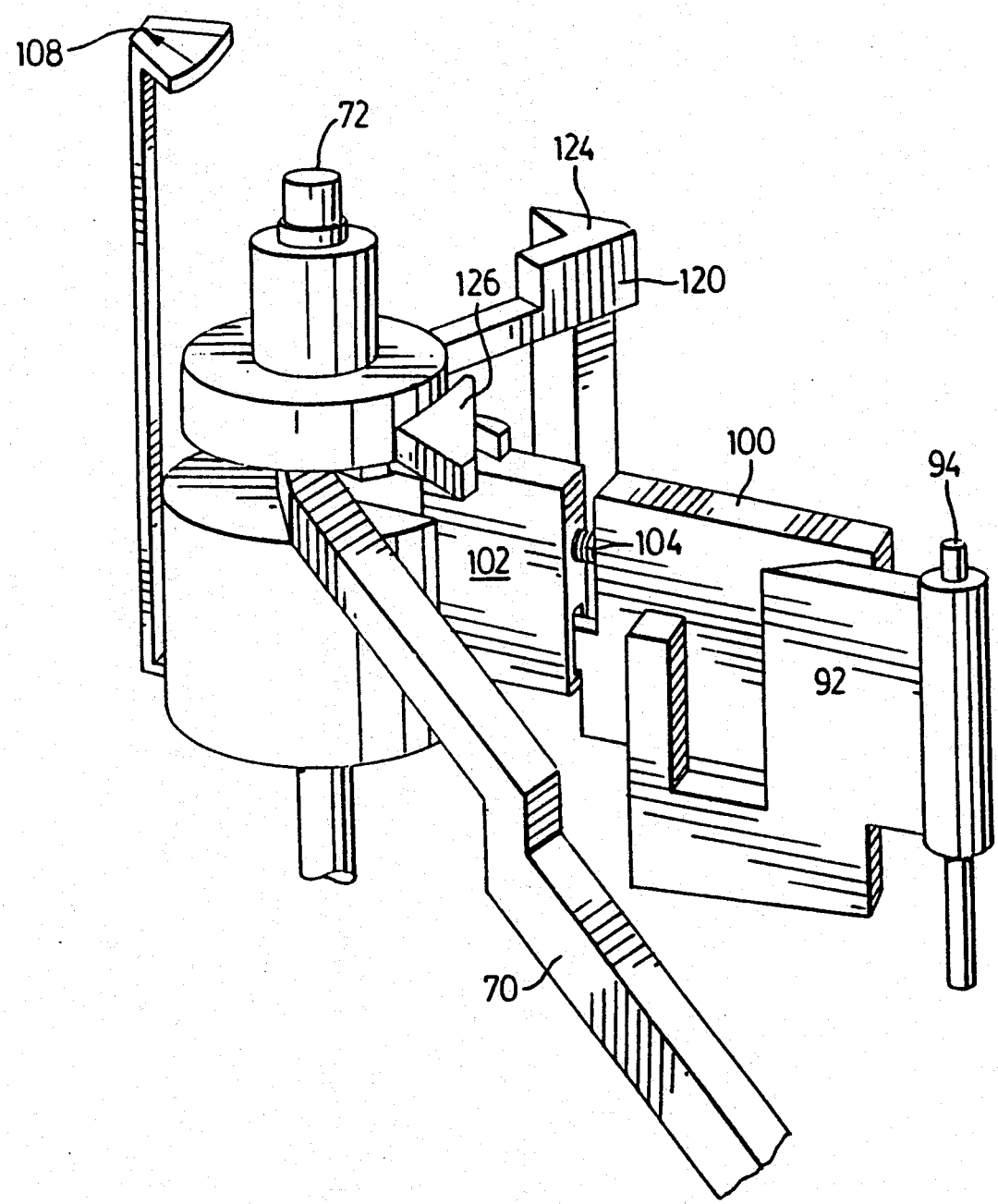
Figure 7:
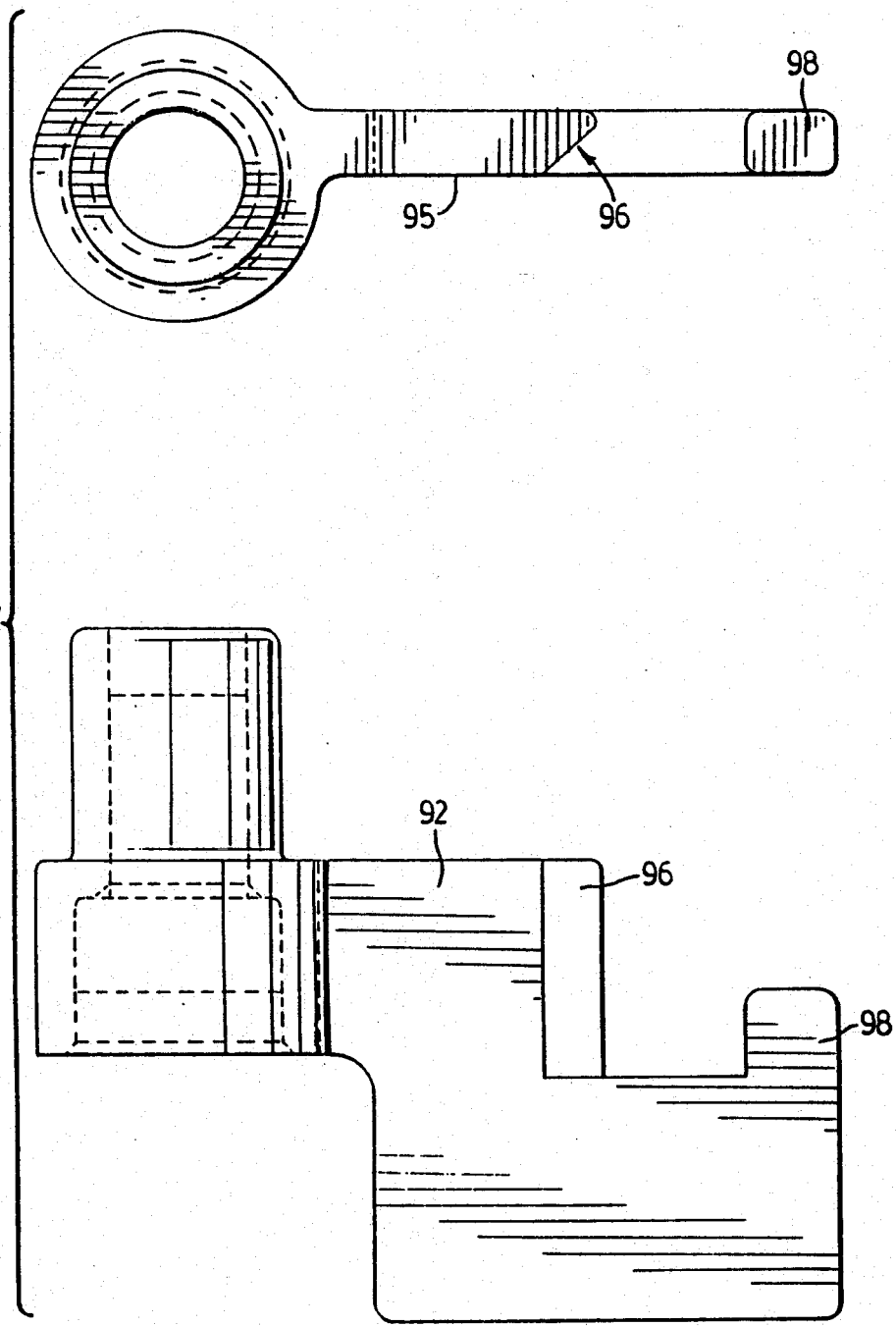
Figure 8:
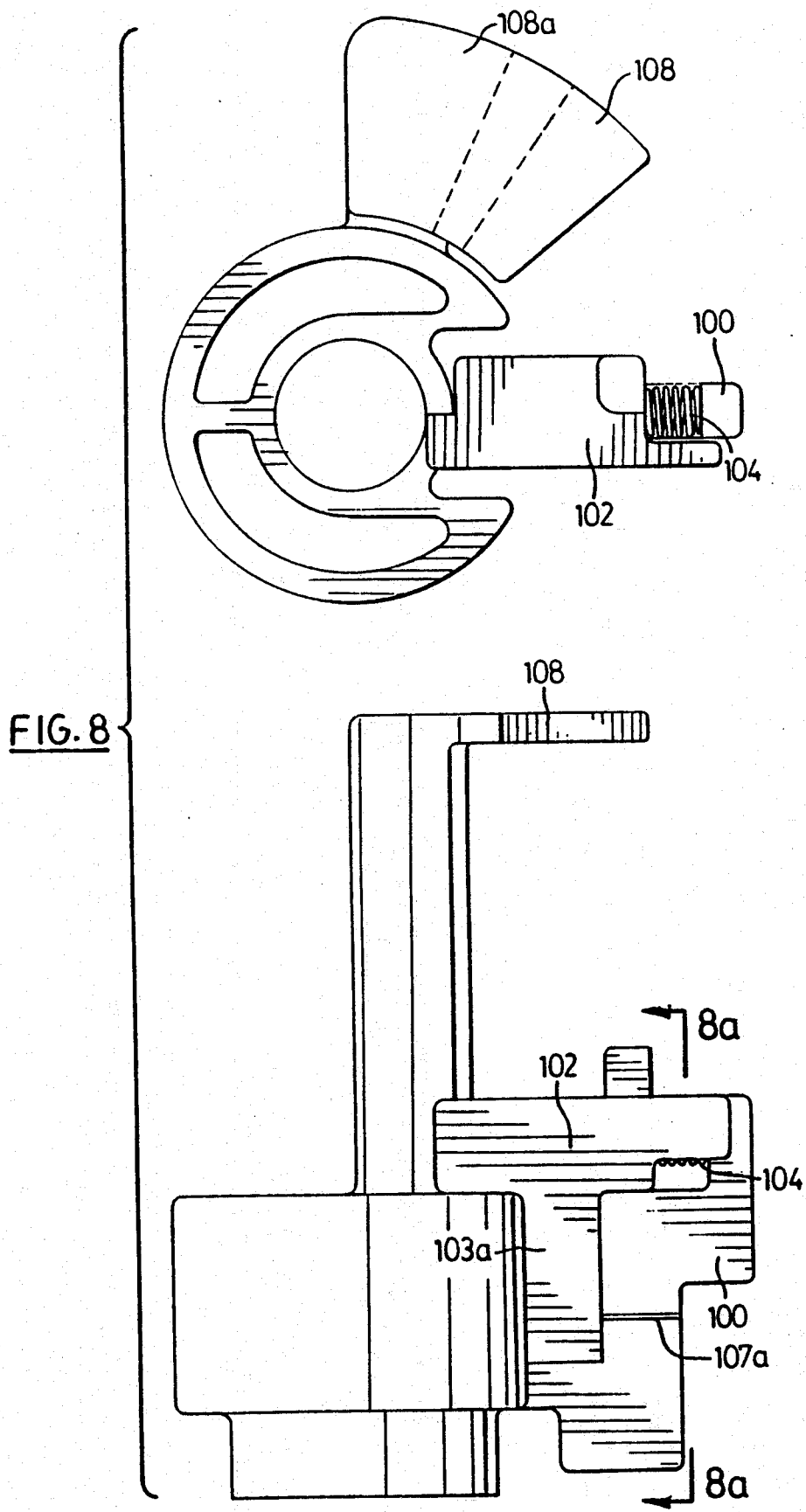
Figure 8A:
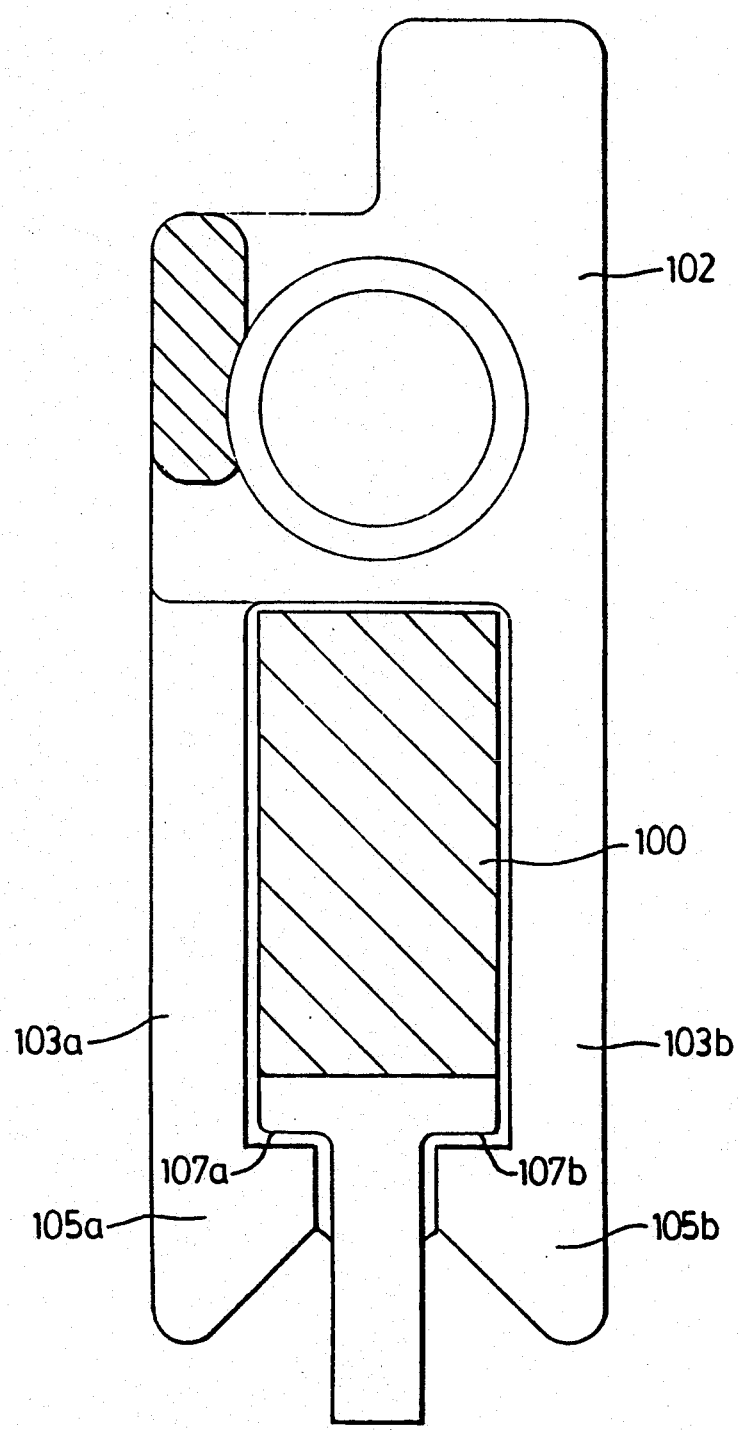

In the figures which provide example embodiments of the invention,

FIG. 1 is a plan view of a tape cassette including a mechanism made in accordance with this invention, FIG. 2 is a plan view of a portion of a FIG. 1, FIG. 2a is a plan view of portion of FIG. 2, FIG. 3 is a sectional view along the lines 3—3 of FIG. 2, FIG. 4 is a plan view of a portion of a the tape cassette of FIG. 1, FIG. 4a is a sectional view along the lines 4a—4a of FIG. 4, FIG. 5 is a plan view of a portion of FIG. 1, FIG. 5a is a sectional view along the lines 5a—5a of FIG. 5, FIG. 6 is a perspective view of a portion of FIG. 1, FIGS. 7 and 8 are front and top views of elements of FIG. 1, FIG. 8a is a sectional view along the lines 8a—8a of FIG. 8, FIG. 9 is a front and top view of an element of FIG. 1, and FIGS. 10 through 13 are plan views illustrating the operation of the tape cassette of FIG. 1.

With reference to FIG. 1, a tape cassette generally indicated at 10 comprises a supply reel 12 and a take-up reel 14. A tape 16 is shown wound around the hub 18 of the supply reel and extends along one side of the cassette to the hub 20 of the take-up reel. The forward feed direction for the take-up reel is illustrated at 62. A lock means for the take-up reel includes locking arm 92 (detailed in FIG. 7) and the elements detailed in FIGS. 2, 2a, and 3.

Referring to FIGS. 2, 2a, and 3, the lock means comprises an inner locking member 22 having a thickened annular base 24 with an exterior annular lip 26 and a plurality of interior upstanding snaps 28 comprising legs 30 and shoulders 32. The inner locking member has a bulbous pawl supporting slot 34 which receives the complimentarily shaped bulbous base 33 of pawl 36. The pawl has a convex back 35 protruding in the counterclockwise direction and a front tapering to a tip 37 in the clockwise direction. An outer locking member 40 comprises a thin annular disk 41 having a medial thickened annulus 42 with a triangular notch 44 therein. The notch slopes to a stop 46 at the clockwise end of the notch. The outer locking member has an inner diameter less than the diameter of lip 26 of the inner member such that the outer member rests on the lip of the inner locking member and may rotate with respect to the inner locking member. A locking tooth 50 is formed on the periphery of the outer locking member ninety degrees from the triangular notch 44 in a counterclockwise direction. A displacer ring 56 rests on the outer locking member between the medial thickened annulus 42 of the outer locking member and the thickened annular base 24 of the inner locking member. The displacer ring has a clearance fit between thickened annulus 42 and thickened annular base 24. The displacer ring is gapped and the pawl is located within this gap. The gap of the displacer ring terminates at its counterclockwise end in stop 52 and at its clockwise end in ramp 54.

With reference to FIG. 1 along with FIGS. 2 and 3, snaps 28 are received in channels 58 of the hub 20 of the take-up reel with the shoulders 30 of the snaps overlying lips 60 of the hub of the take-up reel. Accordingly, the inner locking member is fixed to the take-up reel and rotates therewith. On the other hand, the take-up reel may rotate with respect to the outer locking member.

Locking tooth 50 of the outer locking member extends beyond the periphery of the take-up reel.

In the operation of the sub-assembly of FIGS. 2, 2a, and 3, if tooth 50 is held from rotation and the take-up reel is rotated in a counterclockwise direction, the inner locking member, and hence pawl 36, move counterclockwise therewith. The displacer ring initially remains stationary due to its frictional engagement with the outer locking member on which it rests. However, if counterclockwise rotation of the inner locking member continues, the convex back 35 of the pawl hits stop 52 of the displacer ring and thereafter pushes the displacer ring in a counterclockwise direction. The reaction force exerted on the back of the pawl by stop 52 urges the pawl to rotate clockwise within slot 34 of the inner locking member until a portion of the pawl rests against the periphery of the inner locking member. In this position, the pawl moves freely past the triangular notch in the outer locking member. Thus, the locking means does not impede counterclockwise rotation of the take-up reel, which is the direction of rotation of the take-up reel during rewinding of tape from the take-up reel to the supply reel.

If the take-up reel is rotated in a clockwise direction (illustrated at 62 in FIGS. 1 and 2) while the tooth 50 is held from rotation, the pawl moves clockwise into abutment with ramp 54 of the gap of the displacer ring whereupon the tip of the pawl is ramped into abutment with the thickened medial annulus 42 of the outer locking member. Continued clockwise rotation of the inner locking member results in the pawl pushing the displacer ring in a clockwise direction while the reaction force from the ramp 54 of the displacer ring results in a continuous counterclockwise torque on the pawl about its base 33. This torque causes the tip 37 of the pawl to enter the triangular notch as the pawl is rotated clockwise into registration therewith until the tip of the pawl comes into abutment with stop 46. At this point, in the clockwise direction, the inner locking member is locked to the outer locking member. However, since the outer locking member is held from rotation, this stops the take-up reel. The clockwise direction for the take-up reel is the forward feed direction, accordingly, when the tooth 50 is held from rotation, the take-up reel is inhibited from rotating in a forward feed direction but may rotate in a reverse feed direction.

Returning to FIG. 1, it is noted that the cassette includes a leaf spring 64 fixed at one end between the supply reel and take-up reel with its free end inclined toward the take-up reel in the path of locking tooth 50. Accordingly, when the take-up reel is rotated in a counterclockwise (reverse feed) direction, tooth 50 moves into abutment with the free end of the leaf spring so that the tooth, and hence the outer locking member 40, thereafter remain stationary with continued counterclockwise rotation of the take-up reel. (Recall that with counterclockwise rotation of the take-up reel, the outer locking member is not locked to the take-up reel.) When the take-up reel is rotated in a clockwise (forward feed) direction, the tooth will be stopped by the leaf spring so that the outer locking member will lock to the take-up reel, however, the retaining force of the leaf spring is chosen so that it will not stall the motive force driving the take-up reel. Thus, the locking tooth deflects the leaf spring and rotates past same.

The cassette has a follower arm 70, rotatably mounted at one end to post 72. The follower arm has a medially mounted rotatable wheel 74 and a distally mounted rotatable wheel 76 at the free end of the follower arm. The follower arm is dimensioned such that at most one of wheels 74 and 76 is in contact with the tape 16 of the cassette. The angular position of the follower arm acts as an indicator of the amount of tape on the supply reel 12 or take-up reel 14, as follows. First, given that the cassette is initially in a fully rewound condition and the cassette is then operated in a forward feed direction to transfer tape to the take-up reel, as the layers of tape build on the take-up reel, the outer layer of tape will eventually contact the medial wheel 74. Thereafter, as additional layers of tape are wound onto the take-up reel, the follower arm will deflect in a counterclockwise direction about post 72 until the last layer of tape is wound off the supply reel. Accordingly, while the follower arm is deflected counterclockwise by the layers of tape wound onto the take-up reel, the arm indicates the amount of tape on the take-up reel by its angular position. If the tape is then rewound, the outermost layer of the building layers of tape on the supply reel will eventually contact the distal wheel 76. Thereafter, additional layers of tape added to the supply reel will deflect the follower arm in a clockwise sense about the post 72. Accordingly, while the follower arm is deflected clockwise by the layers of tape wound onto the supply reel, the arm indicates the amount of tape on the supply reel by its angular position.

It is noted that whenever the cassette is switched from forward feeding to rewinding of the tape, or vice versa, there is a "dead zone" during which the angular position of the follower arm does not change to track the amount of tape on either the supply reel or the take-up reel since neither of the wheels 74 and 76 are in contact with the tape. The extent of the dead zone is dependent on the dimensions of the follower arm and it does not affect the operation of the invention for reasons which will become apparent hereinafter. While shaking of the cassette would rotate the follower arm about within this dead zone, the follower arm is never free to rotate clockwise beyond the position illustrated in FIG. 1 due to stop 78 and is limited in its counterclockwise rotation by stop 79.

Turning to FIG. 4, it is seen that the two wheels 74 and 76 of the follower arm 70 are mounted to the arm by three legs: 80a, 80b, and 80c and 82a, 82b, and 82c, respectively. With reference to FIG. 4a, it is seen the outwardly facing portion of the heads 84 of the three legs 80 are radiused and are received in a radiused circumferential notch 86 in the wheel 76. A leg supporting pin 88 is press fit between the three legs 80. The mount for wheel 74 is of similar construction. In view of this construction, the wheels 74 and 76 are not only free to rotate but also have a limited freedom to pivot on their mounts. This ability to pivot compensates for any misalignment between the follower arm and the reels of the cassette which might otherwise accelerate tape wear. The legs of the follower arm are positioned so that when wheel 74 or 76 contacts the tape 16 of the cassette, the point of contact of the tape is between legs 80a and 80b or 82a and 82b, respectively, for most permissible angles of rotation of the follower arm. Accordingly, the reaction force on the wheel of the follower arm is taken up by two legs of the follower arm which provides good wheel stability and hence minimizes the generation of noise due to the wheel during tape play.

Returning to FIG. 1, the cassette also has a take-up reel lock actuation means indicated generally at 90. Lock actuation means 90, as well as the locking arm 92 of the lock means, are illustrated in greater detail in FIGS. 5 through 9.

Turning to FIGS. 5, 5a, and 6, locking arm 92 (detailed in FIG. 7) is rotatably mounted at one end on post 94. The locking arm has a deflection face 95, an angled dwell face 96, and an enlarged locking tip 98. The lock actuation means 90 comprises a locking arm displacer 100 (detailed in FIGS. 8 and 8a) rotatably mounted on post 72. A detent 102 is slidably mounted to the locking arm displacer such that the detent may slide radially with respect to the post 72 by virtue of feet 105a and 105b of legs 103a and 103b of the detent which slidingly engage shoulders 107a and 107b of the locking arm displacer. A compression spring 104 biases the detent radially inwardly. The locking arm displacer supports an indicator flag 108. A torsion spring 99 urges the locking arm 92 against the locking arm displacer 100.

Figure 10:
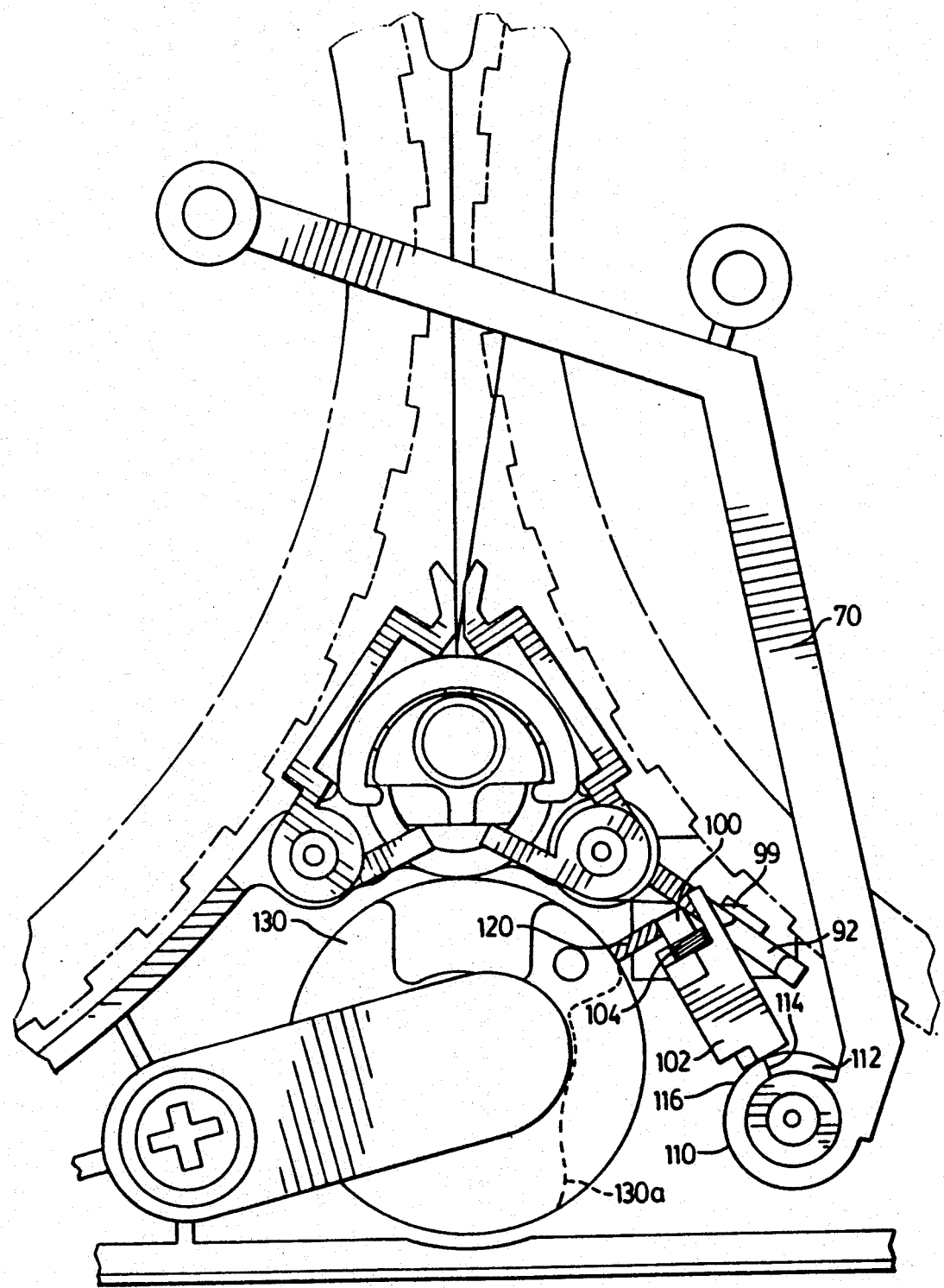
Figure 11:
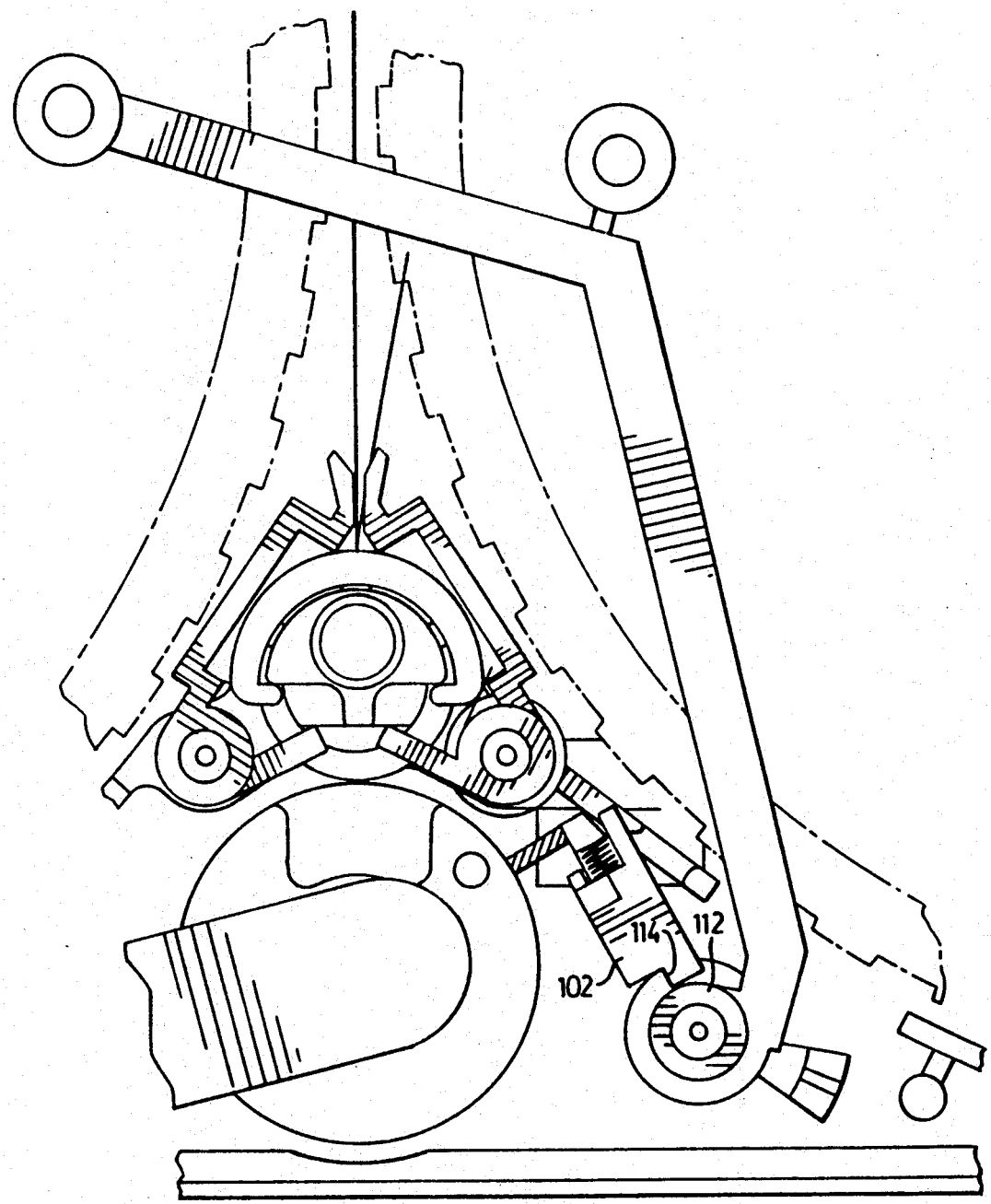

As aforenoted, follower arm 70 is also rotatably mounted on post 72. As best seen in FIG. 10, the follower arm has an arcuate portion 110 centered about post 72. The arcuate portion has a notched segment 112 extending in a clockwise direction from stop 114 and an unnotched segment 116 extending in the other direction from the stop 114. The arcuate portion 110 of the follower arm is positioned on post 72 radially inwardly of the detent 102 of the locking arm displacer with the detent urged into abutment with the arcuate portion 110 due to compression spring 104. Consequently, if the detent is abutting the unnotched segment 116 of the arcuate portion of the follower arm (as illustrated in FIG. 10) and the follower arm is rotated counterclockwise, the detent will snap into the notched segment 112 of the arcuate portion of the follower arm as soon as the detent passes stop 114 (as illustrated in FIG. 11). The point where this occurs is referred to herein as the "trigger point". Since the follower arm is rotated counterclockwise by the layers of tape building on the take-up reel, the trigger point is reached when a pre-determined amount of tape is wound onto the take-up reel. As will be become clearer hereinafter, the lock actuation means is enabled when the detent of the locking arm displacer is received in the notched segment 112 of the follower arm.

Figure 13:
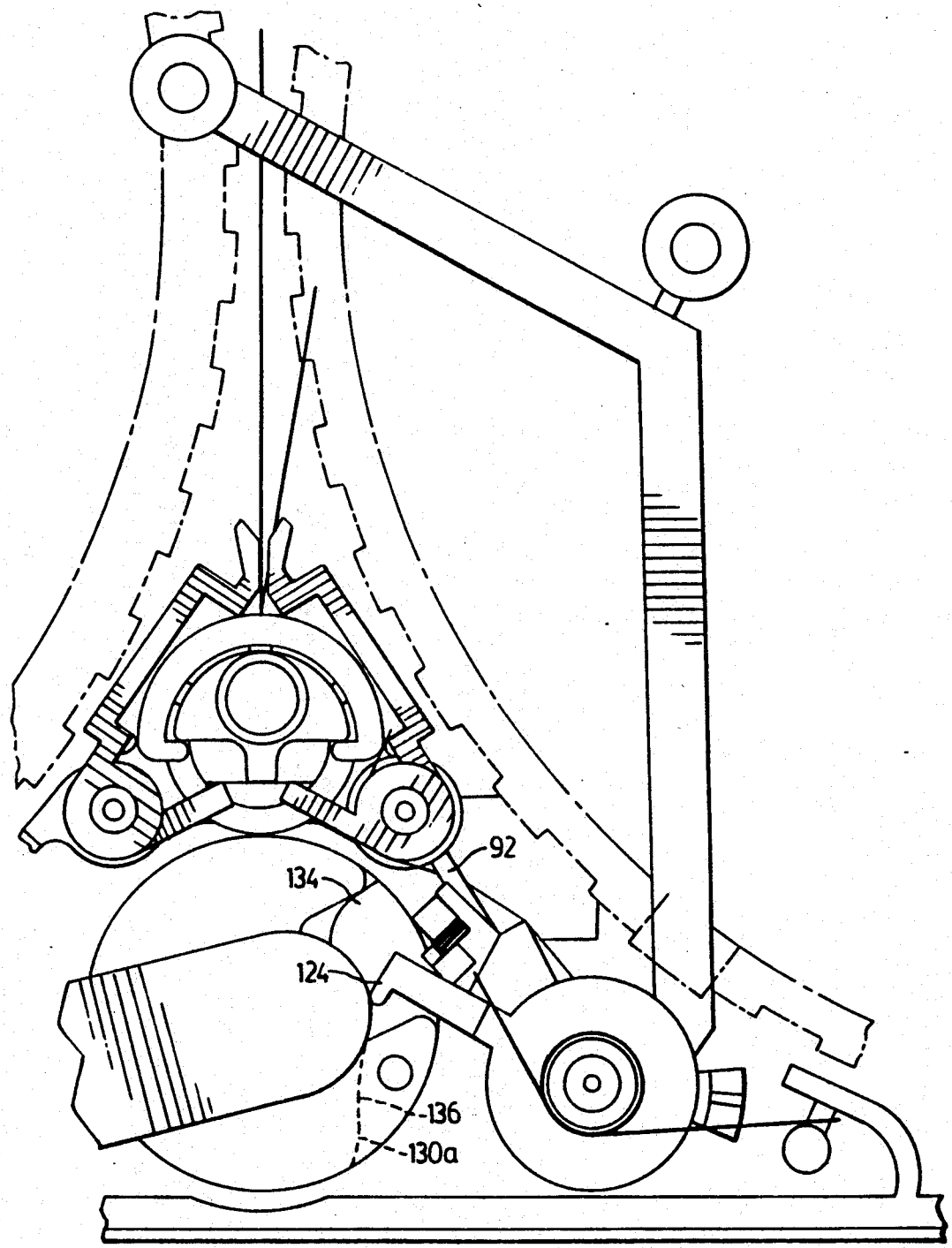

FIGS. 5, 5a, and 6 also illustrate a reset means comprising reset lever 120 (detailed in FIG. 9) rotatably mounted to post 72 and biased by torsion spring 122 so that the head 124 of the reset lever abuts a stack of notched disks 130. Reset lever 120 has a cam 126. A torsion spring 106 urges the locking arm displacer toward the reset lever; the locking arm displacer is in its rest position when it abuts the reset lever. With reference to FIG. 13, the stack of notched disks have notches 134 and the notch of the bottom disk 130a in the stack has a camming surface 136; this disk may be considered a camming disk.

FIGS. 10 through 13 illustrate the operation of the cassette. FIG. 10 shows the cassette with the lock actuation means in a disabled state, that is, with the detent 102 of the locking arm displacer abutting the unnotched segment 116 of the arcuate portion of the follower arm. In the disabled state the locking arm displacer is in its rest position, biased against the reset lever 120 by torsion spring 106. With the lock actuation means disabled, the tape may be freely forward fed and rewound without any effect on the lock actuation means so long as the trigger point is not passed. This is for the reason that the follower arm is not engaged with the lock actuation means when the lock actuation means is in the disabled state.

If the lock actuation means is disabled and the tape is forward fed by clockwise rotation of the take-up reel, the follower arm will rotate counterclockwise about post 72 and the detent 102 will snap into notched segment 112 of the arcuate portion of the follower arm when the follower arm has rotated to an angular position such that the detent just clears stop 114. This is the trigger point; the amount of tape on the take-up reel at the trigger point is pre-selected by the dimensional choices for the cassette. Once the detent has snapped into the notched segment of the follower arm, the lock actuation means is enabled. FIG. 11 illustrates the lock actuation means at the trigger point with the detent 102 of the locking arm displacer received by the notched segment 112 of the arcuate portion of the follower arm.

Continued counterclockwise rotation of the follower arm past the trigger point consequent upon continued forward feeding of tape results in the notched segment 112 of the follower arm sliding along the face of the detent with the stop 114 rotating counterclockwise away from the detent since the locking arm displacer is restrained from following stop 114 by reason of the fact that the locking arm displacer rests against the reset lever 120.

Figure 12:
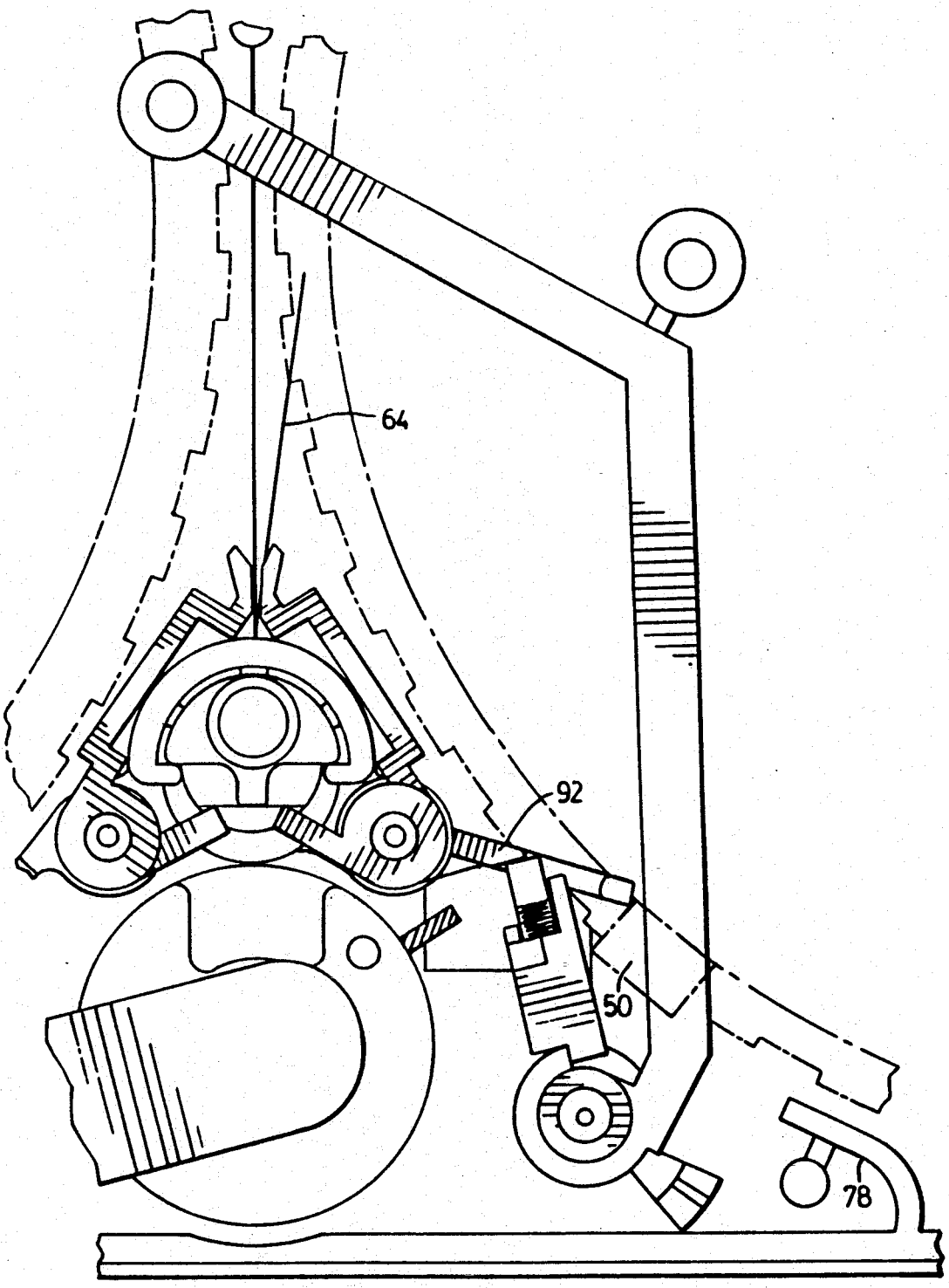

The lock actuation means, when enabled, responds to the follower arm during rewinding, as follows. Once the building layers of tape on the supply reel rotate the follower arm clockwise to the point where the stop 114 abuts the detent 102, further rewinding causes stop 114 to deflect the detent, and the locking arm displacer which carries it, in a clockwise sense about post 72. Since locking arm 92 is biased against the locking arm displacer by torsion spring 99, deflection of the locking arm displacer displaces the locking arm in a counterclockwise sense about post 94. The dimensions of the device are chosen so that if, during rewinding, more then a pre-selected amount of tape is built up on the supply reel when the lock actuation means are enabled, the follower arm is rotated to an angle whereat the locking arm is displaced by the locking arm displacer into the path of the locking tooth 50. The point at which the locking arm has moved into the path of the locking tooth is referred to herein as the lock-up point; once the locking arm has reached the lock-up point, the lock means are actuated. FIG. 12 illustrates the cassette with the lock means actuated.

With the lock means actuated, the cassette may continue to be rewound and tooth 50 will simply rest on leaf spring 64. However, if the tape is forward fed, the take-up reel rotates in a clockwise sense and the tooth moves with the take-up reel until it abuts the locking arm 92 whereupon the tooth will be blocked from further clockwise rotation (as is illustrated in FIG. 12). As explained in connection with FIGS. 2 and 3, continued clockwise rotation of the take-up reel when the tooth 50 is blocked from rotation will cause the tooth supporting outer locking member 40 to lock to the inner locking member 22. And since the inner locking member is fixed to the take-up reel, this locks the take-up reel against further clockwise (forward feed) rotation. Of course it remains possible to recommence rewinding of the cassette, only forward feeding is inhibited in the lock-up state.

Two purposes of leaf spring 64 are to prevent the possibility of the locking tooth jamming against the locking arm during rewinding and to minimize noise.

That is, when the locking arm has moved to the edge of the path of tooth 50 during rewinding, in the absence of leaf spring 64, the tooth would tick against the locking arm for several revolutions as it passed the locking arm until the locking arm had been displaced sufficiently that the tooth would stop against the locking arm. During this period, there is a possibility of the tooth jamming against the end of the locking arm. The leaf spring prevents this as it forms a rest for the tooth on rewinding. While it is possible the tooth could tick past the locking arm on forward feed operation, this is unlikely since the locking arm is only displaced toward the path of the tooth by rewinding. Consequently, the tooth would only tick past the locking arm on forward feeding of the tape if the locking arm had been displaced to the edge of the path of the tooth but not quite to the lock-up point. If the rewinding went past the point of lock-up, forward feeding would be inhibited.

Referring to FIGS. 7 and 12, dwell face 96 of the locking arm is provided to limit the extent to which the locking arm is displaced, as follows. As the locking arm displacer deflects the locking arm in a counterclockwise sense about post 94, the free end of the locking arm displacer initially moves along the deflection face 95 of the locking arm. Continued deflection of the locking arm results in the free end of the locking arm displacer moving into abutment with the dwell face 96 of the locking arm. Thereafter, further rotation of the locking displacer arm in a clockwise sense about post 72 moves the free end of the locking arm displacer along the dwell face 96 which maintains the deflection of the locking arm but does not further deflect same. The dwell face of the locking arm allows, within certain bounds, one cassette construction to be used with varying amounts of tape spliced to the leader tape of the cassette. That is, a cassette is typically manufactured with only transparent leader tape on the reels. At a duplicator, magnetic tape is then spliced to this leader tape. Where the magnetic tape is pre-recorded, the amount of tape that is to be spliced to the leader tape of the cassette may vary. The lock-up point is, however, reached when a pre-determined amount of tape has been wound onto the supply reel irrespective of the length of the tape spliced to the tape of the cassette. The dwell face of the locking arm keeps the locking arm in blocking relation with the locking tooth for different amounts of tape spliced to the tape of the cassette. That is, the dwell face may be of a length which ensures the largest anticipated amount of tape on the supply reel does not urge the free end of the locking arm displacer to rotate past the dwell face.

Stop 78 (of FIG. 1) is positioned to limit the clockwise rotation of the follower arm to just past the point to which the arm would be moved by rewinding of the longest anticipated tape spliced onto the leader tape of the cassette. The stop 78 ensures the follower arm is not rotated to a point whereat the free end of the locking arm displacer rotates past the dwell face of the locking arm. Stop 78 also avoids an improper reset of the lock actuation means for reasons which will be described hereinafter.

The enlarged locking tip 98 (seen in FIG. 7) of the locking arm ensures there is no possibility of the locking tooth missing the locking arm during forward feeding in the lock-up state. This would otherwise be a possibility due to the fact the supply and take-up reels float within the cassette. Similarly, abutment 140 (seen in FIG. 1) positioned in opposition to the locking arm ensures the take-up reel is not translated such that the locking tooth misses the locking arm during forward feeding in the lock-up state.

Once the lock actuation means has been moved past the lock-up point (i.e., once the locking arm has been displaced into the path of tooth 50 by reason of stop 114 acting on the detent of the locking arm displacer), it is necessary to reset the lock actuation means to its disabled state before it is possible to again forward feed the tape. Referring to FIGS. 5 and 6, the reset means comprise reset lever 120. As aforenoted, the reset lever is biased against notched disks 130. The notched disks are a stack of concentric disks having a height less than the height H (see FIG. 9) of the head 124 of the reset lever. Prior to a resetting operation, the disks are in a scrambled state such that their notches 134 are not aligned with the head 124 of the reset lever. In this state, the reset lever abuts the periphery of the stack of notched disks as illustrated in FIGS. 5 and 6; this is referred to herein as the inoperative position of the reset lever. The disks are manipulable by some means external of the cassette. If the disks are manipulated to align the notch of each disk with the head 124 of the reset lever 120, then the head of the reset lever will snap into the aligned notches under the urging of torsion spring 122; this is the operative position of the reset lever and is illustrated in FIG. 13. As the head 124 of the reset lever enters the notches of the disks, the reset lever rotates counterclockwise on post 72 which results in cam 126 of the reset lever camming the detent 102 of the locking arm displacer out of the notch 112 in the follower arm. Once the detent clears stop 114 the locking arm displacer is freed to rotate counterclockwise under the urging of torsion spring 106 to its rest position in abutment with the reset lever. The locking arm 92 follows the locking arm displacer due to the urging of torsion spring 99 so that it continues to rest against the locking arm displacer. Accordingly, detent 102 will now abut the unnotched segment 116 of the arcuate portion of the follower arm so that the lock actuation means is now in its disabled state. The cassette with the operative lever in its operative position and the lock actuation means disabled is illustrated in FIG. 13.

In order to return the reset lever to its inoperative position and complete a reset operation (so that the disabled lock actuation means will become enabled at the trigger point), the camming disk 130a of the stack of notched disks may be rotated so that camming surface 136 cams the head 124 of the reset lever out of the notches 134 in the remaining notched disks 130 whereupon the remaining notched disks may be again scrambled so that their notches are not longer aligned with the head of the reset lever; the camming disk 130a may then also be scrambled.

The follower arm is stationary during a reset operation. This is for the reason that the lock-up point is reached by building layers of tape on the supply reel deflecting the follower arm, consequently, the tape on the supply reel acts to prevent any counterclockwise rotation of the follower arm due to the sliding frictional engagement of the end of the detent with the unnotched arcuate portion of the follower arm as the detent rotates counterclockwise under the urging of torsion spring 106 to its rest position.

As aforedescribed, the locking arm displacer is in its rest position when it abuts the reset lever. However, the rest position of the locking arm displacer when the reset lever is in its operative position is displaced in a counterclockwise direction from the rest position of the locking arm displacer when the reset lever is in its inoperative position. Accordingly, the dimensions of the cassette may be chosen so that the reset rest position of the locking arm displacer places the detent of the locking arm displacer in a position which is displaced counterclockwise from the counterclockwise position of the notch 114 of the follower arm when the follower arm is stopped against stop 79. Thus, if the reset lever is not returned to its inoperative position, the lock actuation means will have no trigger point. That is, there will be no position of the follower arm which will cause the detent to snap into notch 112. Hence, the lock means cannot be enabled. The utility of this design feature will become apparent hereinafter.

It is noted that the tape should be rewound to the lock-up point before a resetting operation since otherwise a resetting operation may not disable the lock actuation means.

The stack of notched disks function as a combination lock since the angular position of the notches of the disks must be known in order to allow the notches to be aligned with the head of the reset lever. The details of construction of a suitable notched disk arrangement functioning as a combination lock are described in U.S. Pat. No. 4,874,143 to Armstrong and Granzotto dated Jun. 9, 1988, the disclosure of which is incorporated herein by reference.

It is noted that, when the lock actuation means is enabled, the stop 78 for the follower arm prevents the follower arm from rotating the locking arm displacer clockwise sufficiently to result in the cam of the reset lever camming detent 102 out of the notch of the follower arm when the reset lever is in its inoperative position.

The flag 108 (see FIGS. 5 and 8) of the locking arm displacer 100 underlies a window (not shown) in the housing of the cassette. Flag 108 will move under the window in the cassette housing when the locking arm displacer rotates. Accordingly, different portions of the surface of the flag 108 will be centered under the window depending on the angular position of the locking arm displacer. Consequently, the flag 108 may be divided into three colour coded zones to indicate different states for the cassette, as follows. The locking arm displacer has been rotated toward the limit of its clockwise rotation when the cassette is in the lock-up state. Accordingly, the zone 108a of the flag at the counterclockwise end of the flag, may indicate the cassette is in the lock-up state. A middle zone 108b of the flag may indicate the locking arm displacer is at or near its rest position against the reset lever and the reset lever is in its inoperative position. This middle zone accordingly indicates the tape of the cassette may be forward fed or rewound. When the operative lever is in its reset position, the locking arm displacer is resting against the reset lever (since the detent has been cammed out of the notch in the follower arm) and so is at the limit of its counterclockwise rotation. Accordingly, a third zone 108c at the clockwise end of the flag indicates that the lock actuation means is disabled and the reset lever is in its reset position. The purpose for such an indication will become clear hereinafter.

It will now be apparent that the cassette, when the lock actuation means is in a disabled state and the reset lever is in its inoperative position, allows the tape to be forward fed from beginning to end only once since thereafter the lock actuation means is enabled which inhibits forward feeding after a pre-selected amount of tape has been rewound onto the supply reel (such that the cassette is in the lock-up state). The cassette does, however, allow limited replay of portions of the tape. By way of example, the cassette may be constructed so that the trigger point is at the point where 75 minutes (SP mode) of the tape has been wound onto the take-up reel and the lock-up point is at the point where 75 minutes (SP mode) of the tape has been wound onto the supply reel (after the lock actuation means has been enabled). Accordingly, the first 75 minutes of the tape up to the trigger point may be replayed an indefinite number of times so long as the 75 minute point is not passed. Also, after the trigger point has been reached, the last 75 minutes of the tape may be replayed an indefinite number of times. However, as soon as the lock-up point is passed on rewinding, the tape will lock up if an attempt is made thereafter to forward feed the tape. Of course once the lock-up point has been passed, it is still possible to rewind the tape.

A tape machine is typically designed to stop rewinding at the beginning of the magnetic tape. If this point is overshot such that some of the leader tape is wound off the take-up reel, some machines will automatically forward feed back to the beginning of the magnetic tape and will not allow the cassette to be ejected until this has been accomplished. In order for the cassette of this invention to function with such tape machines in the worst case scenario, the cassette must be able to forward feed sufficiently to take up all of the leader tape when it is in the lock-up state. Accordingly, the cassette is manufactured with approximately 5.75 inches of leader tape on the take-up reel and is configured to permit up to about 1¾ forward feed revolutions of the take-up reel while the cassette is in the lock-up state, as follows. Referring to FIG. 1, snaps 28a and 28b of the inner locking member of the locking means are spaced more widely than the other snaps, consequently, the inner locking member always has a fixed orientation on the take-up reel 14. This orientation is such that the point of connection 17 of the tape 16 to the take-up reel is displaced slightly in a counterclockwise direction from pawl 36. Furthermore, since tooth 50 of the outer locking member is positioned ninety degrees in a counterclockwise direction from notch 44, the notch 44 is in a pre-determined position when the tooth 50 rests on the leaf spring 64 during rewinding. The position of notch 44 on rewinding is such that when the last layer of tape has been wound off the take-up reel and rewinding is complete, the pawl 36 is displaced slightly in a clockwise direction from the position of the notch 44, as is illustrated in FIG. 1. By virtue of this arrangement, the take-up reel is free to rotate approximately three quarters of a clockwise revolution while the locking tooth rotates with the take-up reel from its rest position on the leaf spring into abutment with the locking arm and is free to rotate approximately a just under a further one clockwise revolution while the pawl rotates into registration with the notch 44.

If it were desired to minimize any forward feed rotation of the take-up reel while the cassette is in the lock-up state, this may be accomplished by repositioning the leaf spring 64 and increasing the number of notches 44 in the outer locking member 40, as will be apparent to one skilled in the art.

The present invention has utility in the video rental industry. If a cassette as aforedescribed has a tape recorded with a movie, the cassette may be rented in a rewound state with the lock actuation means disabled. The rental allows the renter one complete viewing of the movie with the ability to review portions of the movie and the ability to rewind the tape prior to its return. The rental outlet may have access to the combination for the notched disks of the cassette so that the lock actuation means may again be disabled whereupon the cassette is once more ready for rental.

Further, if it is desired to sell a rental tape, the notches of the disk stack may be aligned with the reset lever head so that the operative lever snaps to its reset position and the cassette left in that condition so that, as aforedescribed, the lock actuation means cannot be enabled. Consequently, there will be no restriction on the forward feeding of tape in the cassette which is sold.

The follower arm could be modified such that it included only one wheel along its length which wheel was biased into abutment with either the outer layer of tape of the supply reel or the outer layer of tape of the take-up reel. However, two wheels for the follower arm are preferred as this is believed to be a more tamper proof construction. Other variations within the spirit of this invention will be apparent to those skilled in the art.

What is claimed is:

1. A tape cassette comprising:
    a supply reel;
    a take-up reel;
    forward feed lock means for, upon being actuated, immediately limiting rotation of at least one of said supply reel and said take-up reel to no more than a certain number of revolutions in a forward feed direction when more than said certain number of revolutions of said at least one reel are available in said forward feed direction while not affecting rotation of said supply reel and said take-up reel in a reverse feed direction and without contacting the tape of the tape cassette, said forward feed lock means including a member mounted for relative rotation about the axis of one of said supply reel and said take-up reel and locking means which, during forward feeding of said cassette, whenever said member is inhibited from rotation in a forward feed direction, locks said member to said member mounting reel after permitting at least a fraction of a revolution of relative rotation between said member and said member mounting reel;
    indicator means for indicating the amount of tape on at least one of said supply reel and said take-up reel;
    forward feed lock actuation means for, if disabled, being enabled by said indicator means during forward feeding whenever said indicator means indicates a first pre-selected amount of tape on one of said supply reel and said take-up reel, said forward feed lock actuation means, whenever enabled, responding to said indicator means during rewinding of said tape for actuating said forward feed lock means when said indicator means indicates a second pre-selected amount of tape on one of said supply reel and said take-up reel whereby forward feeding of said tape is thereafter limited while reverse feeding of said tape is unaffected; and
    reset means selectively operable to disable said forward feed lock actuation means at least when said forward feed lock actuation means has actuated said forward feed lock means whereby said forward feed lock actuation means, when disabled, remains disabled until enabled by said indicator means.

2. The tape cassette of claim 1 wherein said forward feed lock means comprises an abutment carried by said member.

3. The tape cassette of claim 2 wherein said forward feed lock means further comprises a rotatable locking arm for rotating into and out of the path of said abutment, said forward feed lock means being actuated when said locking arm is in the path of said abutment.

4. The tape cassette of claim 3 wherein said indicator means comprises a follower arm mounted for rotation about an axis for abutting the outer layer of tape on said supply reel or said take-up reel.

5. The tape cassette of claim 4 wherein said follower arm has an arcuate portion centered about said follower arm axis of rotation, said arcuate portion having a notched segment and wherein said lock actuation means comprises a locking arm displacer rotatable on said axis of rotation and urged to a rest position and means to urge said locking arm into abutment with said locking arm displacer, said locking arm displacer carrying a detent urged into abutment with said arcuate portion whereby said lock actuation means is enabled when said detent is received by said notched segment of said arcuate portion and said locking arm displacer is for displacing said locking arm toward the path of said abutment.

6. The tape cassette of claim 5 wherein said reset means comprises cam means selectively operable to cam said detent of said locking arm displacer out of said notched segment of said follower arm in order to free said locking arm displacer to move to its rest position.

7. The tape cassette of claim 6 including a stack of notched disks and wherein said detent cam means comprises a lever supporting a detent cam and having with a head biased into abutment with the periphery of said notched disks whereby, when the notches of said notched disks are aligned with said head of said lever, said head of said lever enters the aligned notches of said disks and said detent cam cams said detent out of said notched segment of said follower arm.

8. The tape cassette of claim 5 wherein said locking means includes a pawl carried by said member mounting reel, a notch in said member, and means to urge said pawl into said notch when said tape cassette is fed in the forward feed direction and said member is inhibited from rotating in the forward feed direction.

9. The tape cassette of claim 8 further including a rewinding rest for said abutment proximate said locking arm but displaced therefrom in the forward feed direction, said rewinding rest ensuring said notch of said member retains a set position during rewinding and wherein said pawl is so positioned with respect to a clip clipping said tape to the pawl carrying reel such that when said tape is completely rewound said pawl is slightly displaced from said notch of said member in the forward feed direction whereby said member mounting reel may be rotated in excess of one revolution in the forward feed direction after rewinding and when said locking arm is in the path of said abutment.

10. The tape cassette of claim 5 wherein said locking arm displacer includes an indicator flag for indicating said lock actuation means is enabled and less than the second pre-selected amount of tape is on said one of said supply reel and said take-up reel.

11. The tape cassette of claim 5 wherein said locking arm comprises a dwell face for limiting its displacement by said locking arm displacer into the path of said abutment.

12. The tape cassette of claim 4 wherein said follower arm comprises a rotatable wheel having an axis of rotation which may tilt, said wheel for abutting the outer layer of tape on said supply reel or said take-up reel.

13. The tape cassette of claim 12 wherein said wheel of said follower arm is supported by a three-legged support oriented such that any point of contact between said wheel and said outer layer of tape is between two legs of said three legged support for at least most of the positions taken by said follower arm.

14. The tape cassette of claim 2 wherein said reset means is also selectively operable to disconnect said forward feed lock actuation means such that said forward feed lock actuation means, when disconnected, is incapable of being enabled by said indicator means.

15. The tape cassette of claim 1 wherein said forward feed lock means, when actuated, immediately limits rotation of said at least one reel in a forward feed direction to about 1¾ revolutions.

16. A tape cassette comprising:
a supply reel;
a take-up reel;
forward feed lock means for, upon being actuated, immediately limiting rotation of at least one of said supply reel and said take-up reel to no more than a certain number of revolutions in a forward feed direction when more than said certain number of revolutions of said at least one reel are available in said forward feed direction while not affecting rotation of said supply reel and said take-up reel in a reverse feed direction and without contacting the tape of the tape cassette, said forward feed lock means including a member mounted for relative rotation about the axis of said take-up reel and locking means which, during forward feeding of said cassette, whenever said member is inhibited from rotation in a forward feed direction, locks said member to said take-up reel after permitting at least a fraction of a revolution of relative rotation between said member and said take-up reel;
indicator means for indicating the amount of tape on said take-up reel during forward feeding and for indicating the amount of tape on said supply reel during rewinding;
forward feed lock actuation means for, if disabled, being enabled by said indicator means during forward feeding whenever said indicator means indicates a first pre-selected amount of tape on said take-up reel, said forward feed lock actuation means, whenever enabled, responding to said indicator means during rewinding of said tape for actuating said forward feed lock means when said indicator means indicates a second pre-selected amount of tape on said supply reel whereby forward feeding of said tape is thereafter limited while reverse feeding of said tape is unaffected; and
reset means selectively operable to disable said forward feed lock actuation means at least when said forward feed lock actuation means has actuated said forward feed lock means whereby said forward feed lock actuation means, when disabled, remains disabled until enabled by said indicator means.

17. The tape cassette of claim 16 wherein said forward feed lock means comprises an abutment carried by said member.

18. The tape cassette of claim 17 wherein said forward feed lock means further comprises a rotatable locking arm for rotating into and out of the path of said abutment, said forward feed lock means being actuated when said locking arm is in the path of said abutment.

19. The tape cassette of claim 18 wherein said indicator means comprises a follower arm mounted for rotation about an axis for abutting the outer layer of tape on said supply reel or said take-up reel.

20. The tape cassette of claim 19 wherein said follower arm has an arcuate portion centered about said follower arm axis of rotation, said arcuate portion having a notched segment and wherein said lock actuation means comprises a locking arm displacer rotatable on said axis of rotation and urged to a rest position and means to urge said locking arm into abutment with said locking arm displacer, said locking arm displacer carrying a detent urged into abutment with said arcuate portion whereby said lock actuation means is enabled when said detent is received by said notched segment of said arcuate portion and said locking arm displacer is for displacing said locking arm toward the path of said abutment.

21. The tape cassette of claim 20 wherein said reset means comprises cam means selectively operable to cam said detent of said locking arm displacer out of said notched segment of said follower arm in order to free said locking arm displacer to move to its rest position.

22. The tape cassette of claim 21 including a stack of notched disks and wherein said detent cam means comprises a lever supporting a detent cam and having with a head biased into abutment with the periphery of said notched disks whereby, when the notches of said notched disks are aligned with said head of said lever, said head of said lever enters the aligned notches of said disks and said detent cam cams said detent out of said notched segment of said follower arm.

23. The tape cassette of claim 20 wherein said locking means includes a pawl carried by said take-up reel, a notch in said member, and means to urge said pawl into said notch when said tape cassette is fed in the forward feed direction and said member is inhibited from rotating in the forward feed direction.

24. The tape cassette of claim 23 further including a rewinding rest for said abutment proximate said locking arm but displaced therefrom in the forward feed direction, said rewinding rest ensuring said notch of said member retains a set position during rewinding and wherein said pawl is so positioned with respect to a clip clipping said tape to the pawl carrying reel such that when said tape is completely rewound said pawl is slightly displaced from said notch of said member in the forward feed direction whereby said take-up reel may be rotated in excess of one revolution in the forward feed direction after rewinding and when said locking arm is in the path of said abutment.

25. The tape cassette of claim 23 wherein said follower arm comprises two rotatable wheels each having an axis of rotation which may tilt, one for abutting the outer layer of tape on said supply reel and one for abutting the outer layer of tape on said take-up reel.

26. The tape cassette of claim 25 wherein each of said two wheels of said follower arm is supported by a three-legged support oriented such that any point of contact between each said wheel and said outer layer of tape is between two legs of said three-legged support for at least most of the positions taken by said follower arm.

27. The tape cassette of claim 25 including a reel brake mechanism positioned medially between said supply reel and said take-up reel and wherein said axis of rotation for said follower arm is offset from the position of said reel brake mechanism so as to be more toward one of said take-up reel and said supply reel and wherein said follower arm extends from said axis of rotation toward the closer one of said supply reel and said take-up reel and then bends toward the other of said supply reel and said take-up reel, one of said two wheels mounted medially on said follower arm proximate said bend and the other of said wheels mounted proximate the end of said follower arm distal from said axis of rotation, said wheels having a width approximately equal to the width of said tape such that said wheels, when in contact with said tape, contact said tape over the width of said tape.

28. The tape cassette of claim 20 wherein said locking arm displacer includes an indicator flag for indicating said lock actuation means is enabled and less than the second pre-selected amount of tape is on said take-up reel.

29. The tape cassette of claim 20 wherein said locking arm comprises a dwell face for limiting its displacement by said locking arm displacer into the path of said abutment.

30. The tape cassette of claim 17 wherein said reset means is also selectively operable to disconnect said forward feed lock actuation means such that said forward feed lock actuation means, when disconnected, is incapable of being enabled by said indicator means.

31. The tape cassette of claim 16 wherein said forward feed lock means, when actuated, immediately limits rotation of said at least one reel in a forward feed direction to about 1¾ revolutions.

* * * * *